(12) United States Patent
Sakamoto

(10) Patent No.: US 11,052,707 B2
(45) Date of Patent: Jul. 6, 2021

(54) PNEUMATIC TIRE

(71) Applicant: TOYO TIRE & RUBBER CO., LTD., Itami (JP)

(72) Inventor: Sachio Sakamoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 201 days.

(21) Appl. No.: 16/233,334

(22) Filed: Dec. 27, 2018

(65) Prior Publication Data

US 2019/0217668 A1    Jul. 18, 2019

(30) Foreign Application Priority Data

Jan. 17, 2018   (JP) .............................. JP2018-005687

(51) Int. Cl.
*B60C 11/03*  (2006.01)
*B60C 11/00*  (2006.01)
*B60C 11/13*  (2006.01)

(52) U.S. Cl.
CPC ........ *B60C 11/0083* (2013.01); *B60C 11/033* (2013.01); *B60C 11/0304* (2013.01); *B60C 11/0316* (2013.01); *B60C 11/1376* (2013.01); *B60C 2011/0341* (2013.01); *B60C 2011/0381* (2013.01)

(58) Field of Classification Search
CPC ..... B60C 11/033; B60C 11/03; B60C 11/008; B60C 11/1376
See application file for complete search history.

(56) References Cited

U.S. PATENT DOCUMENTS 2,756,460 A * 7/1956 Heintz, Jr. ......... B29D 30/0606
                                                        425/28.1
5,322,106 A * 6/1994 Kamegawa ............. B60C 11/00
                                                        152/209.15
(Continued)

FOREIGN PATENT DOCUMENTS

CA        2980736 A1    9/2016
DE       60200634 T2    6/2005
(Continued)

OTHER PUBLICATIONS

JP H09142106 Machine Translation; Masayuki, Oshima; (Year: 1997).*

(Continued)

*Primary Examiner* — Katelyn B Whatley
*Assistant Examiner* — Nicholas J Weiler
(74) *Attorney, Agent, or Firm* — Westerman, Hattori, Daniels & Adrian, LLP

(57) ABSTRACT

A pneumatic tire has a tread face, a plurality of main grooves extending in a tire circumferential direction in the tread face, and a plurality of land lines defined by the plurality of main grooves on the tread face. At least one of the plurality of land lines protrudes outward in a tire diametrical direction from a profile line. A top face of a central portion of the land line in a width direction is formed in an arc shape protruding outward in the tire diametrical direction in a section along a tire meridian. Top faces of opposite end portions of the land line in the width direction are formed in arc shapes protruding inward in the tire diametrical direction in the section along the tire meridian.

6 Claims, 6 Drawing Sheets

(56) References Cited

U.S. PATENT DOCUMENTS

| | | | |
|---|---|---|---|
| 6,439,284 B1 * | 8/2002 | Fontaine | B60C 11/0302 |
| | | | 152/209.15 |
| 6,514,366 B1 * | 2/2003 | Xie | B60C 11/0318 |
| | | | 156/110.1 |
| 2004/0045649 A1 * | 3/2004 | Lopez | B60C 11/11 |
| | | | 152/209.1 |
| 2006/0108039 A1 * | 5/2006 | Kaji | B60C 11/1392 |
| | | | 152/209.15 |
| 2017/0008353 A1 * | 1/2017 | Kishizoe | B60C 11/0008 |
| 2018/0072108 A1 * | 3/2018 | Jacobs | B60C 11/1376 |

FOREIGN PATENT DOCUMENTS

| | | | | | |
|---|---|---|---|---|---|
| EP | 2457745 | A1 * | 5/2012 | | B60C 11/0304 |
| JP | H07-025208 | A | 1/1995 | | |
| JP | H09-142106 | A * | 6/1997 | | B60C 11/1376 |
| JP | 2010120534 | A * | 6/2010 | | |
| JP | 2015-182680 | A | 10/2015 | | |
| JP | 2016-022758 | A | 2/2016 | | |
| JP | 2017-019398 | A | 1/2017 | | |
| JP | 2017-30635 | A | 2/2017 | | |

OTHER PUBLICATIONS

Office Action dated Aug. 4, 2020, issued in counterpart CN Application No. 201811547068.6, with English translation. (17 pages).

Office Action dated Jan. 22, 2021, issued in counterpart DE Application No. 102018133619.5, with English Translation. (18 pages).

\* cited by examiner

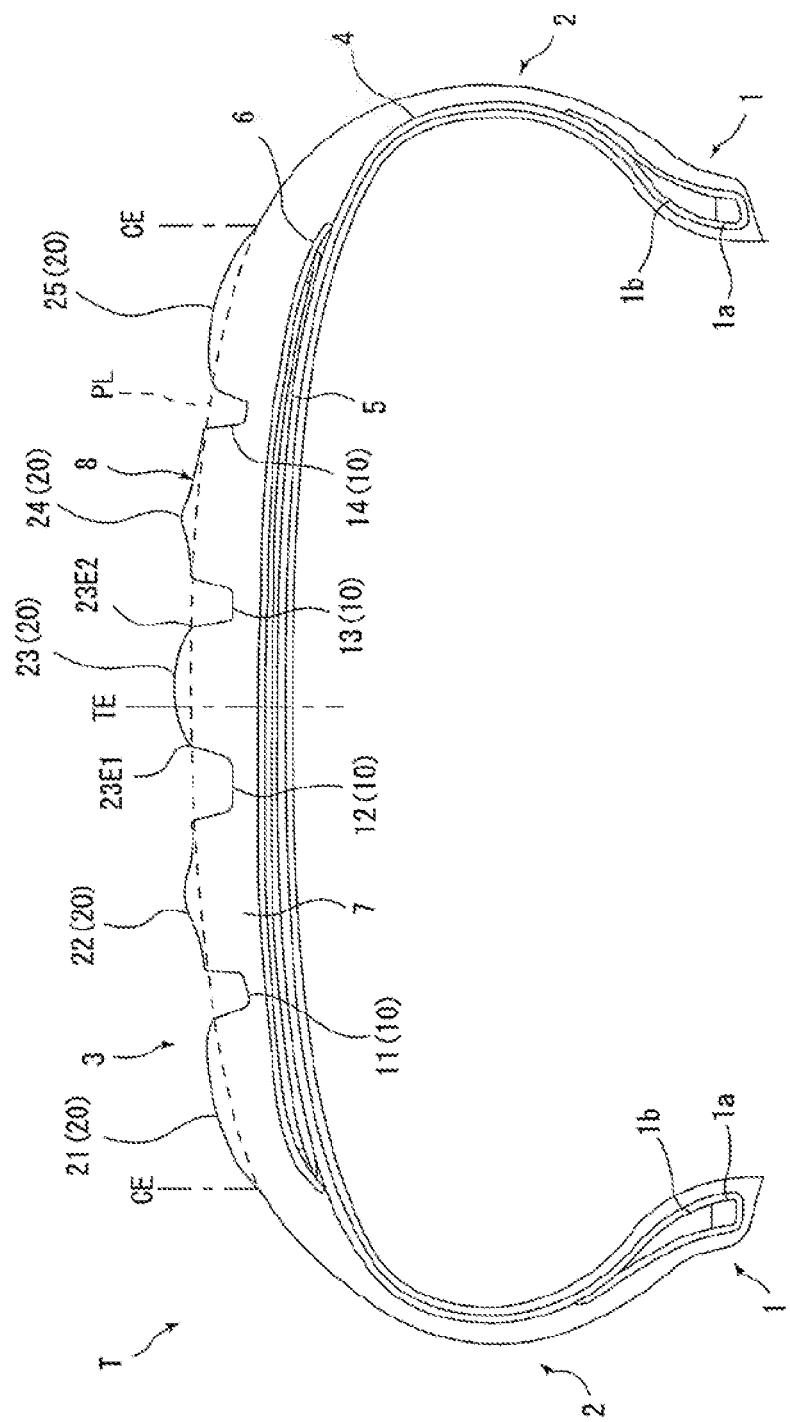
[Fig. 1]

[Fig. 2]
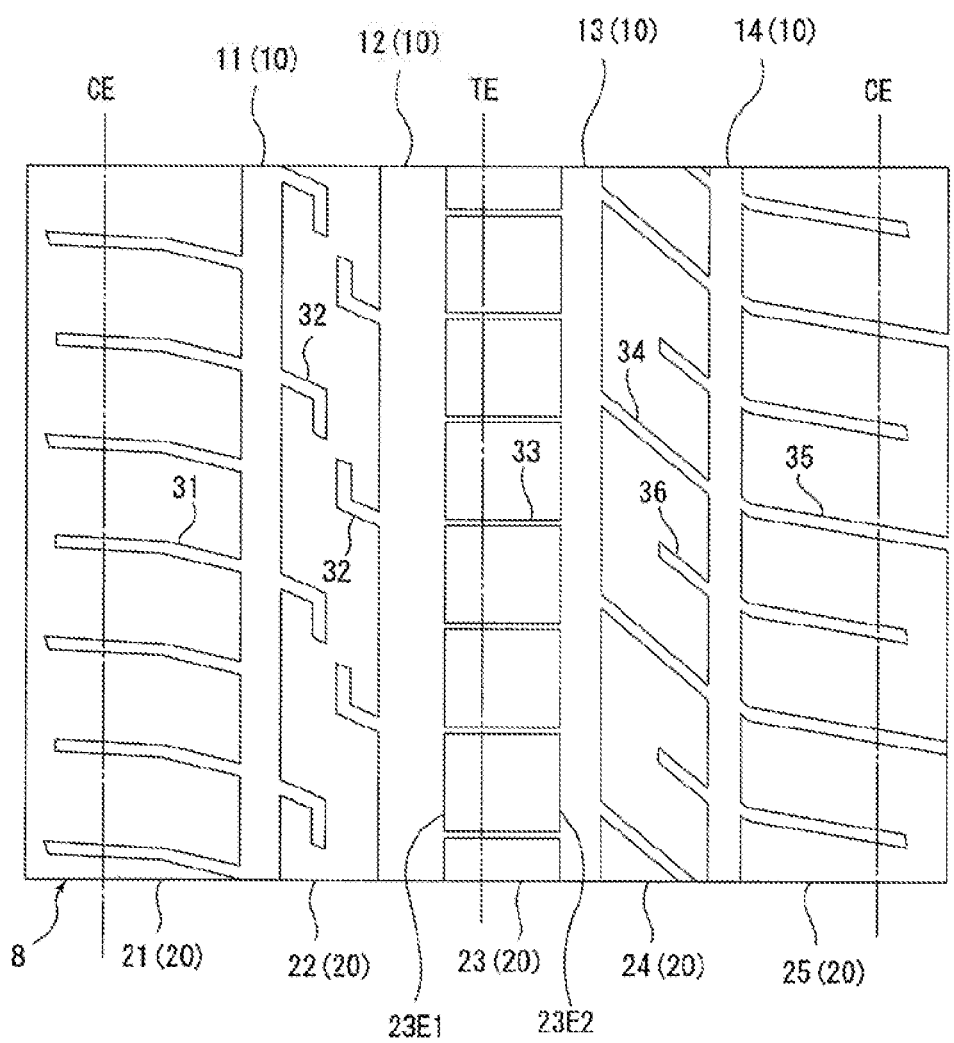

[Fig. 3]
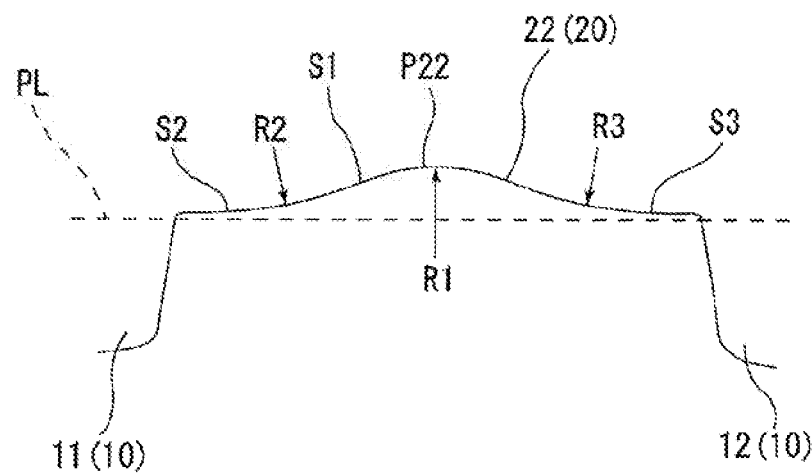
[Fig. 4]
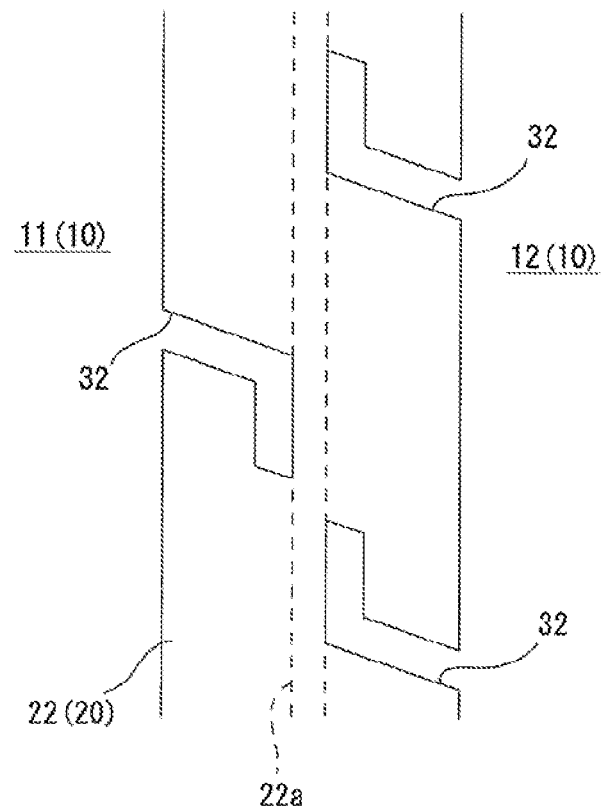

[Fig. 5]
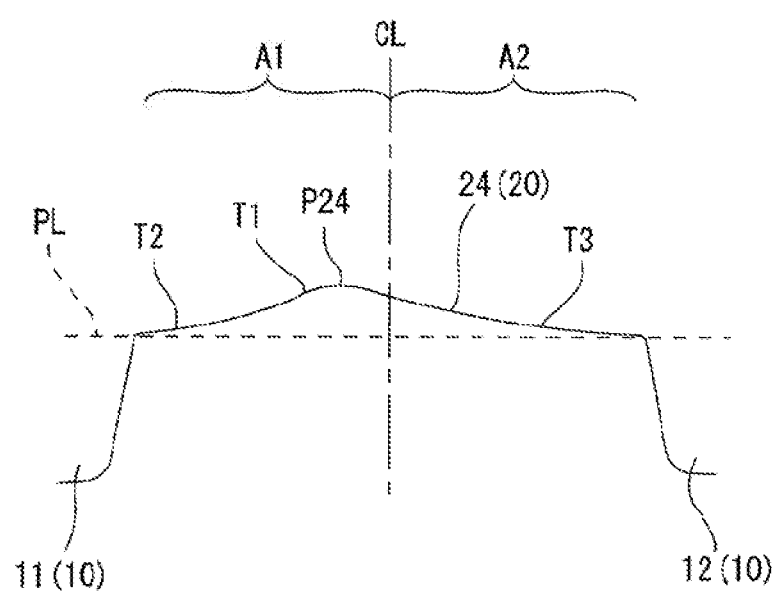

[Fig. 6]
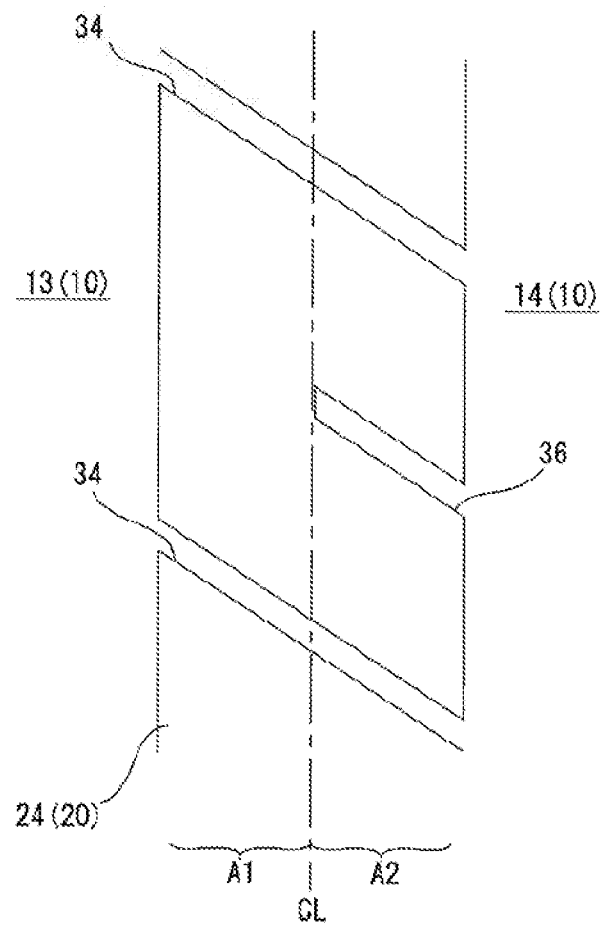

[Fig. 7]
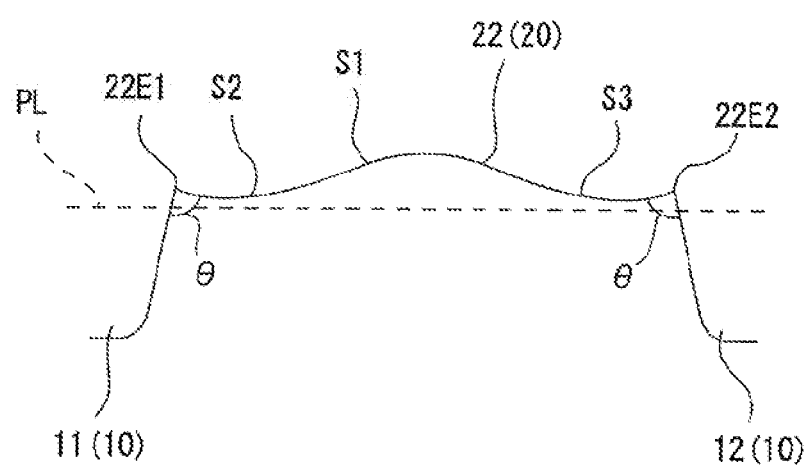

PNEUMATIC TIRE

BACKGROUND OF THE INVENTION

Field of the Invention

The present invention relates to a pneumatic tire with a land line protruding outward in a tire diametrical direction from a profile line.

Description of the Related Art

Normally, a plurality of land lines are provided on a tread face of a pneumatic tire and top faces of the respective land lines are aligned with a profile line forming an arc shape in a section along a tire meridian. On the other hand, as described in Patent Documents 1 and 2, there are known pneumatic tires each of which has land lines protruding outward in a tire diametrical direction from a profile line. Such a tread configuration is intended for improvement of a contact property of a tread face and more concretely for increase of irregular wear resistance and braking performance by uniformizing contact pressure in the tread face.

In order to improve the contact property of the tread face, it is preferable to enhance the contact property of each of the land lines. However, in the tire described in each of Patent Documents 1 and 2, a top face of each of the land lines is formed, as a whole, in an arc shape protruding outward in the tire diametrical direction and it has been found that there is room for improvement of the contact property of each of the land lines. In other words, end portions of the land line in a width direction have low circumferential rigidity and a relatively high stretch degree in inflation as compared to a central portion in the width direction not facing main grooves and therefore have excessively enhanced contact properties, if the top face of the land line is formed, as a whole, in the arc shape protruding outward in the tire diametrical direction.

PRIOR ART DOCUMENTS

Patent Documents
Patent Document 1: JP-A-2017-030635
Patent Document 2: JP-A-2015-182680

SUMMARY OF THE INVENTION

The present invention has been made with the above-described circumstances in view and its object is to provide a pneumatic tire with enhanced contact properties of land lines.

The present invention provides a tread face, a plurality of main grooves extending in a tire circumferential direction in the tread face, and a plurality of land lines defined by the plurality of main grooves on the tread face, wherein at least one of the plurality of land lines protrudes outward in a tire diametrical direction from a profile line, a top face of a central portion of the land line in a width direction is formed in an arc shape protruding outward in the tire diametrical direction in a section along a tire meridian, and top faces of opposite end portions of the land line in the width direction are formed in arc shapes protruding inward in the tire diametrical direction in the section along the tire meridian. In this way, it is possible to enhance a contact property of the land line by helping the central portion of the land line in the width direction come in contact with the ground while preventing excessive enhancement of the contact with the ground of the opposite end portions of the land line in the width direction.

In a configuration having notches formed on both sides of the land line, circumferential rigidity of the opposite end portions of the land line in the width direction reduces, which tends to enhance contact with the ground. Therefore, the above-described shape of the top face of the land line is especially useful. If one or both of the notches formed on the opposite sides of the land line have tip end portions extending along the tire circumferential direction, this configuration increases tendency toward the enhancement of the contact with the ground of the opposite end portions in the width direction. Therefore, the shape of the top face of the land line mentioned above is highly effective.

It is preferable that a void ratio of a first area positioned on one side of a center of a width of the land line is smaller than a void ratio of a second area positioned on the other side and a position where the land line has a largest protruding height from the profile line is provided in the first area. With this configuration, it is possible to effectively enhance the contact property of the land line when the land line has the different void ratios between the one side and the other side in the width direction.

In the pneumatic tire, contact with the ground around edges of the land line is not necessarily secured, because the top faces of the opposite end portions of the land line in the width direction are formed in the arc shapes protruding inward in the tire diametrical direction. Therefore, in order to secure the contact with the ground around the edge of the land line, a shape of the edge of the land line tapered outward in the tire diametrical direction may be employed.

BRIEF DESCRIPTION OF THE DRAWINGS

FIG. 1 is a schematic sectional view along a tire meridian of an example of a pneumatic tire according to the present invention;
FIG. 2 is a developed view of a tread face;
FIG. 3 is a sectional view of a mediate land line;
FIG. 4 is a plan view of the mediate land line;
FIG. 5 is a sectional view of a mediate land line;
FIG. 6 is a plan view of the mediate land line; and
FIG. 7 is a sectional view of a mediate land line according to another embodiment of the invention.

DETAILED DESCRIPTION OF THE PREFERRED EMBODIMENTS

Embodiments of the present invention will be described below with reference to the drawings.

As shown in FIG. 1, a pneumatic tire T includes paired bead portions 1, 1, paired sidewall portions 2, 2 respectively extending outward in a tire diametrical direction from the bead portions 1, and a tread portion 3 connected to outer ends in the tire diametrical direction of the respective sidewall portions 2. A carcass layer 4 is provided in a toroidal shape between the paired bead portions 1, 1. Each of end portions of the carcass layer 4 is rolled up to wrap a bead core 1a and a bead filler 1b embedded in the bead portion 1.

On an outer side of the carcass layer 4 in the tire diametrical direction, a belt layer 5, a belt reinforcing layer 6, and a tread rubber 7 are provided. The belt layer 5 includes a plurality of belt plies. The respective belt plies are formed by covering cords, extending obliquely with respect to a tire circumferential direction, with rubber. The belt plies are layered so that the cords cross each other in opposite orientations to each other in the respective plies. The belt reinforcing layer 6 is formed by covering cords, extending substantially in the tire circumferential direction, with rubber. A tread face 8 that forms an outer peripheral face of the tread rubber 7 is provided with a tread pattern.

As shown in FIGS. 1 and 2, the tread face 8 is provided with a plurality of main grooves 10 extending in the tire circumferential direction and a plurality of land lines 20 defined by the plurality of main grooves 10. Preferably, three or more main grooves 10 are provided. In the embodiment, four main grooves 10 are provided in the tread face 8 and five land lines 20 are defined by the four main grooves 10.

The four main grooves 10 include paired center main grooves 12, 13 positioned on left and right opposite sides of a tire equator TE and paired shoulder main grooves 11, 14 positioned on outer sides of the center main grooves 12, 13 in a tire width direction. The paired shoulder main grooves 11, 14 are positioned on outermost sides in the tire width direction among the plurality of main grooves 10. Although all of the four main grooves 10 are straight grooves, part or all of the main grooves 10 may be zigzag grooves. The five land lines 20 include a center land line 23 passing through the tire equator TE, paired mediate land lines 22, 24 positioned on outer sides of the center land line 23 in the tire width direction, and paired shoulder land lines 21, 25 positioned on the outer sides of the mediate land lines 22, 24 in the tire width direction.

The center land line 23 is provided between the paired center main grooves 12, 13. The mediate land line 22 is provided between the shoulder main groove 11 and the center main groove 12 and the mediate land line 24 is provided between the center main groove 13 and the shoulder main groove 14. The shoulder land line 21 is provided between the shoulder main groove 11 and a contact end CE and the shoulder land line 25 is provided between the shoulder main groove 14 and a contact end CE. The contact ends CE refer to outermost positions in the tire width direction of a contact face that comes in contact with a flat road surface when the tire mounted to a normal rim and inflated to normal internal pressure is placed vertically on the road surface and a normal load is applied to the tire.

The normal rim refers to a rim specified for each tire by standards in a standard system including the standards according to which tires are provided, and is "Standard Rim" in JATMA, "Design Rim" in TRA, or "Measuring Rim" in ETRTO, for example. The normal internal pressure refers to an air pressure specified for each tire by the standards in the standard system including the standards according to which tires are provided, and is "Maximum Air Pressure" in JATMA, a maximum value shown in Table, "TIRE LOAD LIMITS AT VARIOUS COLD INFLATION PRESSURES" in TRA, or "INFLATION PRESSURE" in ETRTO, however, in the case that the tire is for a passenger car, it is set to 180 kPa. The normal load refers to a load specified for each tire by standards in a standard system including the standards according to which tires are provided, and is "a maximum load capacity" in JATMA, a maximum value described in the Table in TRA, or "LOAD CAPACITY" in ETRTO, however, in the case that the tire is for a passenger car, it is 85% of a corresponding load to 180 kPa of internal pressure.

In the embodiment, the mediate land line 22 (hereinafter merely referred to as "land line 22" in some cases) is formed as a rib extending continuously in the tire circumferential direction. The land line 22 is not provided with lateral grooves separating the land line 22 into blocks in the tire circumferential direction. The land line 22 is provided with a plurality of notches 32 formed at intervals in the tire circumferential direction. Each of the notches is a groove extending between one end portion open into the main groove and the other end closed in the land line. The land lines 20 other than the land line 22 are formed as block lines in which a plurality of blocks separated from each other in the tire circumferential direction by lateral grooves 31, 33 to 35, respectively, are arranged. However, the respective land lines are not limited to the above-described configurations and may be ribs or block lines.

A profile line PL is an imaginary line passing through the closest edge among edges of the land lines 20 to the tire equator TE (hereinafter referred to as "closest edge") and the opposite contact ends CE, CE and forming a single arc in the section along a tire meridian. In the embodiment, an edge 23E1 positioned on the left side in the figures among edges 23E1, 23E2 of the center land line 23 is the closest edge. If the main grooves 10 are the zigzag grooves and the edges of the land lines 20 wind in the tire width direction, the closest edge is determined at a center of a width of the winding. If the edges of the land lines 20 have chamfered shapes, a point of intersection of an extended line of a top face of the land line 20 and an extended line of a groove wall face is regarded as the edge and the closest edge is determined. If there are two closest edges on left and right sides, one of the edges positioned on the inner side in the tire diametrical direction is employed.

As shown in FIG. 3, in the embodiment, the land line 22 protrudes outward in the tire diametrical direction from the profile line PL and a top face S1 of a central portion of the land line 22 in the width direction is formed in an arc shape protruding outward in the tire diametrical direction in the section along the tire meridian and top faces S2, S3 of opposite end portions of the land line 22 in the width direction are formed in arc shapes protruding inward in the tire diametrical direction in the section along the tire meridian. In this way, it is possible to enhance a contact property of the land line 22 by helping the central portion of the land line 22 in the width direction come in contact with the ground while preventing excessive enhancement of the contact with the ground of the opposite end portions of the land line 22 in the width direction. The enhancement of the contact property of the land line 22 contributes to improvement of a contact property of the tread face 8, which increases irregular wear resistance and braking performance.

The top face S1 is in the shape along an arc having a center (not shown) on an inner side of the top face S1 in the tire diametrical direction while each of the top faces S2, S3 is in the shape along an arc having a center (not shown) on an outer side of each of the top faces S2, S3 in the tire diametrical direction. Radiuses R1 to R3 of curvature are preferably 5000 mm or smaller in order to secure a contact pressure at the land line 22. Furthermore, the radiuses R1 to R3 of curvature are preferably larger than 50 mm in order to prevent the local contact pressures at the land line 22 from becoming excessively high. This holds true for radiuses of curvature of top faces T1 to T3 described later.

A peak P22 shown in FIG. 3 is a position where the top face of the land line 22 has the largest protruding height from the profile line PL. The peak P22 is included in the top face S1 and therefore provided at a central portion of the land line 22 in the width direction. Although the peak P22 is positioned at the center of a width of the land line 22 in the embodiment, the position of the peak P22 is not limited to the center as described later and a peak P22 may be at a position displaced from a center of a width of a land line 22.

As shown in FIG. 4, in the embodiment, the notches 32 are formed on opposite sides of the land line 22. As a result, circumferential rigidity of the opposite end portions of the land line 22 in the width direction reduces, which may enhance the contact with the ground. Therefore, the above-described shape of the top face of the land line 22 is especially useful. The notches 32 on the opposite sides do not overlap one another in the width direction of the land line 22 and a void-less area 22a extending in the tire circumferential direction is provided at the central portion of the land line 22 in the width direction. The void-less area 22a is an area not provided with grooves or sipes and extends in an annular shape along the tire circumferential direction in the case of the rib as in the embodiment. In the case of a block line, a void-less area extends continuously in a tire circumferential direction between lateral grooves. Although a stretch degree tends to be especially low in inflation in the void-less area 22a, the arc shape of the top face S1 protruding outward in the tire diametrical direction effectively enhances the contact property.

Each of the notches 32 has a tip end portion (the other end portion closed in the land line 20) extending along the tire circumferential direction. In this configuration, the ends of the land line 22 in the width direction are liable to stretch, which increases tendency toward the enhancement of the contact with ground. In correcting this tendency, the arc shapes of the top faces S2, S3 protruding inward in the tire diametrical direction are highly effective. Although the notches 32 formed on both the sides of the land line 22 are provided with the tip end portions in the embodiment, the notches 32 on one side may be provided with the tip end portions. Although each of the notches 32 is bent in a hook shape to have an L shape, the shape of each of the notches 32 is not limited to the L shape.

As shown in FIG. 5, in the embodiment, the mediate land line 24 (hereinafter merely referred to as "land line 24" in some cases) protrudes outward in the tire diametrical direction from the profile line PL and a top face T1 of a central portion of the land line 24 in the width direction is formed in an arc shape protruding outward in the tire diametrical direction in the section along the tire meridian and top faces T2, T3 of opposite end portions of the land line 24 in the width direction are formed in arc shapes protruding inward in the tire diametrical direction in the section along the tire meridian. In this way, it is possible to enhance the contact property of the land line 24 by helping the central portion of the land line 24 in the width direction come in contact with the ground while preventing excessive enhancement of the contact with ground of the opposite end portions of the land line 24 in the width direction.

As shown in FIG. 6, notches 36 are formed only on one side (a right side in FIG. 5) of the land line 24 in the width direction and notches are not formed on an opposite side. Therefore, the land line 24 has different void ratios between the one side and the other side in the width direction. To put it concretely, a void ratio V1 of a first area A1 positioned on the one side (a left side in FIGS. 5 and 6) of a center of a width of the land line 24 is smaller than a void ratio V2 of a second area A2 positioned on the other side (the right side in FIGS. 5 and 6) (i.e., V1<V2). A position (a peak P24) where the land line 24 has the largest protruding height from the profile line PL is provided in the first area A1.

A center line CL shown in FIGS. 5 and 6 is an imaginary line passing through the center of the width of the land line 22 and having a straight-line shape. The center line CL separates the land line 22 into the first area A1 and the second area A2. The void ratio is obtained as a value x/(x+y) by dividing an opening area x of a groove in a top face of a land line by the sum of an area y of a contact portion of the top face of the land line and the opening area x of the groove. Therefore, the void ratio V1 is obtained by dividing opening areas of grooves in the first area A1 (the lateral grooves 34 and the notches 36) by the sum of an area of a contact portion of the first area A1 and the opening areas of the grooves. The void ratio V2 is obtained similarly. A void ratio difference (V1−V2) is 3(%) or larger, for example.

The land line 24 is the block line having the notches 36 open only on one side and the void ratio is smaller in the first area A1 than in the second area A2 as described above. Therefore, in the first area A1, a stretch degree is relatively low in inflation and, as a result, a contact property tends to reduce. However, the peak P24 is displaced from the center line CL and provided in the first area A1 in the tire T, which helps the first area A1 come in contact with the ground to enhance the contact property of the land line 24. The enhancement of the contact property of the land line 24 contributes to improvement of a contact property of the tread face 8, which increases irregular wear resistance and braking performance.

In the embodiment, the above-described configuration for enhancing the contact property of the land line is applied to each of the paired mediate land lines 22, 24. As described already, the top face of the central portion of each of the mediate land lines 22, 24 in the width direction is formed in the arc shape protruding outward in the tire diametrical direction in the section along the tire meridian and the top faces of the opposite end portions of each of the mediate land lines 22, 24 in the width direction are formed in the arc shapes protruding inward in the tire diametrical direction in the section along the tire meridian. The land line(s) to which the configuration for enhancing the contact property is applied is/are preferably the center land line and/or the mediate land line(s).

Although the five land lines 20 each protrude outward in the tire diametrical direction from the profile line PL in the example shown in the embodiment, the invention is not limited to this example. At least one of a plurality of land lines 20 needs to protrude outward in a tire diametrical direction from a profile line PL and it suffices that the configuration for enhancing the contact property is applied to the land line protruding outward in the tire diametrical direction from the profile line PL.

FIG. 7 shows a variation of the land line 22. Because the variation have the same configurations as that of the above-described embodiment except configurations described below, the common configurations will not be described and differences will be mainly described. The configurations described in the above embodiment will be provided with the same reference signs and will not be described repeatedly.

In FIG. 7, as in the above-described embodiment, a top face S1 of a central portion of a land line 22 in a width direction is formed in an arc shape protruding upward and top faces S2, S3 of opposite end portions of the land line 22 in the width direction are formed in arc shapes protruding downward. Moreover, edges 22E1, 22E2 of the land line 22 are tapered outward in a tire diametrical direction. The edges 22E1, 22E2 are each formed to have an acute angle (θ<90 degrees) in a warped shape. In this way, while forming the top faces S2, S3 in the arc shapes protruding downward, it is easy to secure contact around the edges. Such a shape may be applied to one of the paired edges 22E1, 22E2 or to the land line 24 shown in FIG. 5.

The pneumatic tire according to the invention can be formed in the same way as a normal pneumatic tire except that the tread face is formed in the above-described manner.

Therefore, any of conventionally known materials, shapes, configurations, and manufacturing methods can be employed in the invention.

The present invention is not limited to the embodiment mentioned above, but can be improved and modified variously within the scope of the present invention.

What is claimed is:

1. A pneumatic tire comprising:
   a tread face;
   a plurality of main grooves extending in a tire circumferential direction in the tread face; and
   a plurality of land lines defined by the plurality of main grooves on the tread face,
   wherein at least one of the plurality of land lines protrude outward in a tire diametrical direction from a profile line,
   a top face of a central portion of the at least one land line in a width direction is formed in an arc shape protruding outward in the tire diametrical direction in a section along a tire meridian, and
   top faces of opposite end portions of the at least one land line in the width direction are formed in arc shapes protruding inward in the tire diametrical direction in the section along the tire meridian,
   wherein an edge of the at least one land line is tapered outward in the tire diametrical direction.

2. The pneumatic tire according to claim 1, wherein notches are formed on opposite sides of the at least one land line.

3. The pneumatic tire according to claim 2, wherein one or both of the notches formed on the opposite sides of the at least one land line each have a tip end portion extending along the tire circumferential direction.

4. The pneumatic tire according to claim 2, wherein the notches formed on the opposite sides of the at least one land line do not overlap one another in the width direction of the at least one land line and a void-less area extending in the tire circumferential direction is provided at the central portion of the at least one land line in the width direction.

5. The pneumatic tire according to claim 1, wherein a void ratio of a first area positioned on one side of a center of a width of the at least one land line is smaller than a void ratio of a second area positioned on the other side of the center of the width of the land line and a position where the at least one land line has a largest protruding height from the profile line is provided in the first area.

6. The pneumatic tire according to claim 1, wherein the at least one land line is a center land line passing through a tire equator or a mediate land line positioned on an outer side of a center land line in a tire width direction.

* * * * *